March 31, 1953  E. P. G. WRIGHT  2,633,500
CORDLESS SWITCHBOARD TELECOMMUNICATION EXCHANGE
Original Filed Aug. 6, 1947  8 Sheets-Sheet 1
FIG. 1.
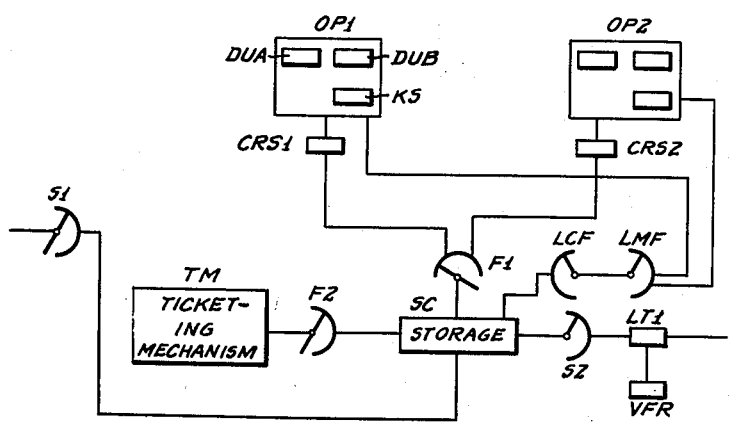
FIG. 4.
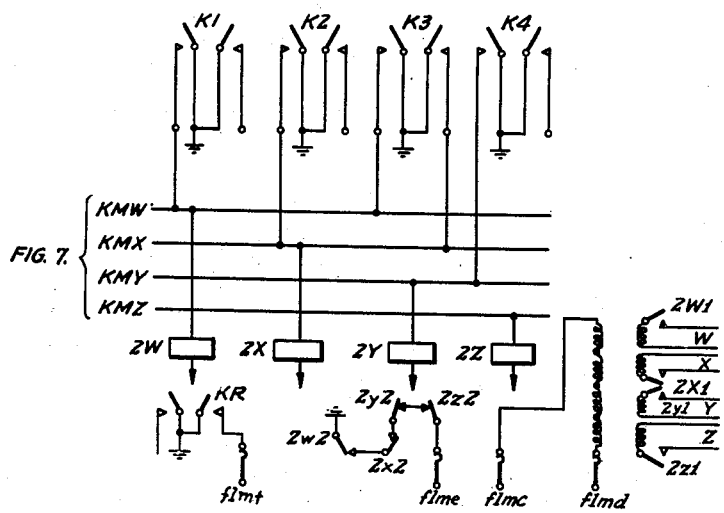
FIG. 7.
INVENTOR.
ESMOND PHILIP GOODWIN WRIGHT
BY
Robert Harding Jr.
ATTORNEY

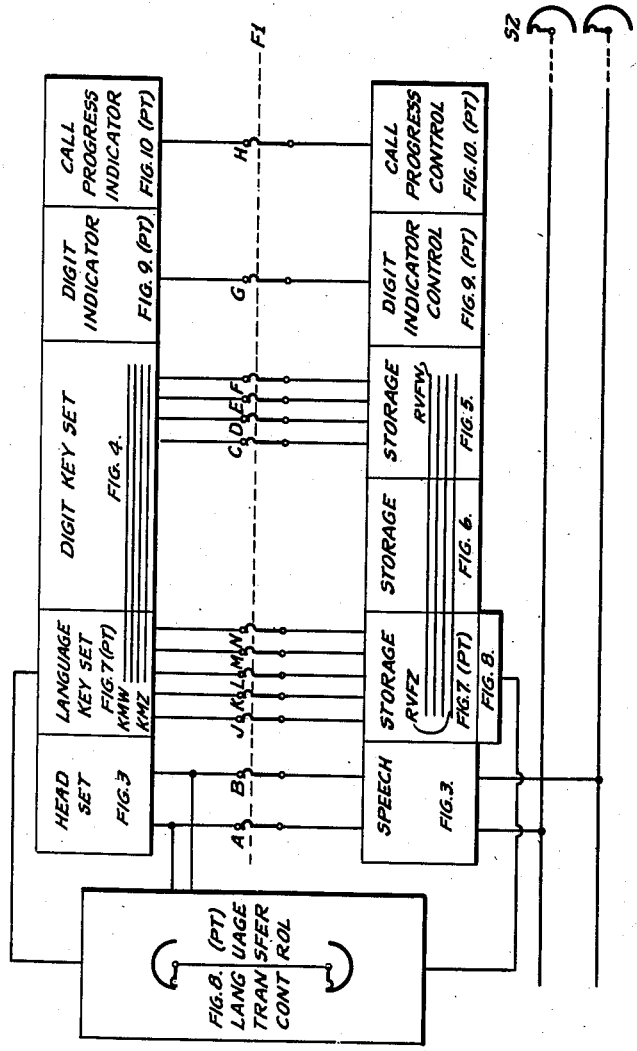

March 31, 1953   E. P. G. WRIGHT   2,633,500
CORDLESS SWITCHBOARD TELECOMMUNICATION EXCHANGE
Original Filed Aug. 6, 1947                                8 Sheets-Sheet 3

INVENTOR.
ESMOND PHILIP GOODWIN WRIGHT
BY
*Robert Harding Jr.*
ATTORNEY

March 31, 1953  E. P. G. WRIGHT  2,633,500
CORDLESS SWITCHBOARD TELECOMMUNICATION EXCHANGE
Original Filed Aug. 6, 1947  8 Sheets-Sheet 4

INVENTOR.
ESMOND PHILIP GOODWIN WRIGHT
BY
ATTORNEY

INVENTOR.
ESMOND PHILIP GOODWIN WRIGHT
ATTORNEY

March 31, 1953  E. P. G. WRIGHT  2,633,500
CORDLESS SWITCHBOARD TELECOMMUNICATION EXCHANGE
Original Filed Aug. 6, 1947  8 Sheets-Sheet 8

INVENTOR.
ESMOND PHILIP GOODWIN WRIGHT
ATTORNEY

Patented Mar. 31, 1953

2,633,500

UNITED STATES PATENT OFFICE 2,633,500

CORDLESS SWITCHBOARD TELECOMMUNICATION EXCHANGE

Esmond Philip Goodwin Wright, London, England, assignor to International Standard Electric Corporation, New York, N. Y., a corporation of Delaware Original application August 6, 1947, Serial No. 766,634. Divided and this application August 6, 1947, Serial No. 766,635. In Great Britain April 3, 1947

13 Claims. (Cl. 179—27)

This invention relates to cordless operators' switchboards and to telecommunication exchanges incorporating such switchboards.

The object of the invention is to provide improved flexibility of handling of calls on operators' switchboards.

The main feature of the invention comprises a cordless operators' switchboard or section thereof for a telecommunication exchange comprising a number of positions in which means are provided with means for visually offering a call of a particular character between operators.

My copending U. S. application Serial No. 766,634 filed August 6, 1947 entitled "Telecommunication Switching System," of which this application is a divisional, contains claims directed to the telecommunication exchange hereinafter disclosed.

The invention will be clearly understood from the following description of one embodiment shown in the accompanying drawings in which:

Fig. 1 is a schematic of connecting circuits and associated operators' circuits at an international telephone exchange.

Fig. 2 shows the relation to one another of the detailed circuits shown in Figs. 3–10 and the use made of switch F1 for connecting together these figures or different parts thereof, all of which with the exception of Fig. 8 form part of either or both of the circuits OP and SG, Fig. 1.

Fig. 4 shows an operator's digit key set and associated equipment for transmitting digits on a V. F. (voice frequency) code basis.

Fig. 9 shows number indicating equipment at the operator's position and means in SG, Fig. 1 for controlling the setting of the number indicating equipment, while.

Figure 3:
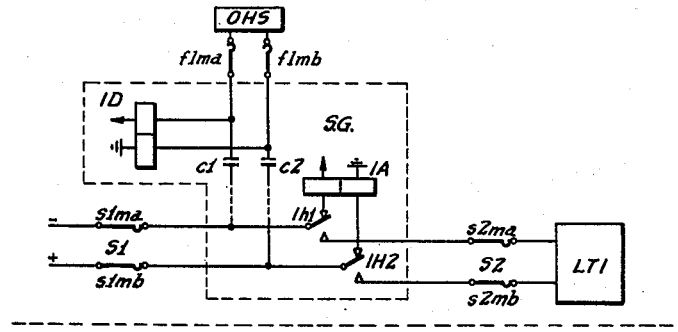
Fig. 3 shows a talking connection circuit in SG associated via switch F1 with operator's cordless positions OP1, OP2.
Figure 6:
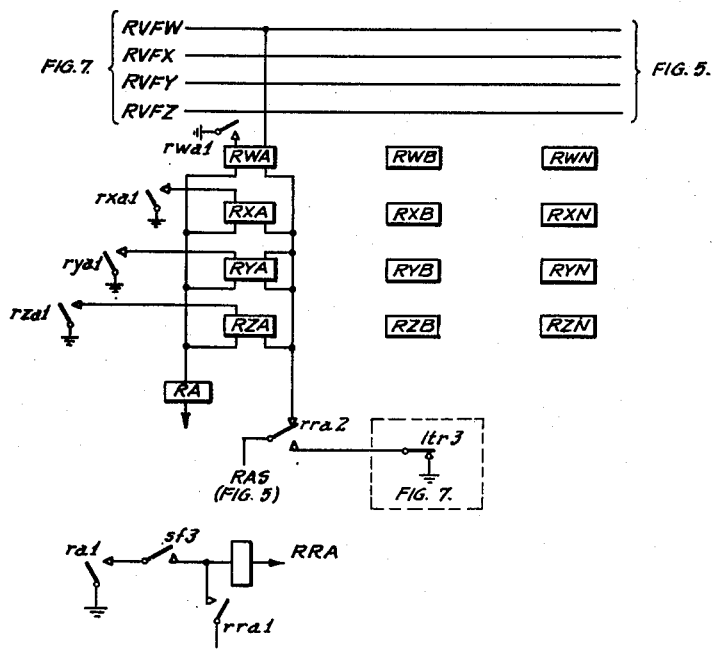
Fig. 6 shows calling number storage equipment forming part of SG, Fig. 1.

For long distance connections the use of special manual positions are often found to be necessary in order to provide the most appropriate facilities for the long distance operator to carry out the necessary operations with the least delay.

It has long been the practice for the long distance operator to write on a ticket the details of each call.

This procedure has been valuable both for the calculation of the fee to be charged and the posting of the charge against the subscriber's account. In addition the ticket has provided a useful means of storing the information when a call is delayed on account of congestion.

On the other hand the use of such tickets involves a considerable amount of clerical labour and tends to slow up the essential work of the long distance operator.

It is known to provide means for automatically recording the information regarding a connection which an operator would normally write on a ticket, but the provision of such means in semiautomatic working would leave the operator without any record of the particulars of the connection.

It is now proposed to give an operator an indication of particulars of a connection such as the numbers of the called and calling parties to a connection and of the number of digits of a called party's number which have been transmitted over a long-distance line in setting up a connection.

Other information such as the chargeable time which has elapsed could also be indicated to the operator.

According to normal practice a long distance operator's position will not be restricted to a single call and once the operator is satisfied that the calling party has been correctly connected she is free to undertake the establishment of a second connection. It should be understood therefore that the operator has the possibility of disassociating her telephone set from a connection which she has set up, and that she can also disassociate her indicating apparatus in preparation for the handling of a subsequent connection. Means may also be provided whereby the relevant indications of a previous connection can be again displayed if the operator wishes to have access to this information.

In certain long distance calls and more particularly on international calls a degree of complexity in the operating is introduced by language differences. Generally speaking international calls rely on one or other of a few languages which are understood by most international operators, but if international calls are established on a semiautomatic basis the answer may be expressed in many languages or dialects and for this reason it is desirable that the originating operator should have facilities for obtaining assistance rapidly either from another operator in the same exchange or from an operator at the distant end of the connection.

It is proposed that by means of a simple key operation it will be possible for any operator to invite the assistance of a second operator in the same line or switchboards indicating at the same time the language in which assistance was required. If such an operator accepts the invitation her position will become coupled with the connection and the indications of the call will become displayed on the relief operator's position so that she is in a condition to take over the supervision of the call from the operator who originally set up the call. If and when this condition is determined upon materially the former operator can withdraw and disassociate her position from the connection.

This transfer feature may also be valuable for other purposes such as the handling of delay traffic on cordless type switchboards.

If congestion on a particular route is experienced it is probable that the most efficient method of clearing off the overload is to allocate one or several operators to the available circuits and in this way to arrange that the circuits are used for a succession of calls so long as the congestion occurs. When a call for a delayed route is received by an ordinary line operator she can record the call order, check the calling subscribing number and transfer the call order to a relay position or a clerical position where the details are recorded and passed to the appropriate delay operator in chronological order.

Fig. 1 shows in schematic form the arrangement of a semi automatic long distance switchboard in which S1 represents a selector through which subscribers obtain access to the recording positions such as OP1 and OP2.

SG represents a storage group and F1 a finder switch. Each new call is extended to the appropriate or free position by means of a storage group SG and a finder such as F1 giving access to all positions.

The operator's position includes two display units DUA and DUB which can be used to indicate the identity of the calling and called numbers. In addition the positions each contain a key set KS and a code relay set or code responder CRS in addition to other apparatus not shown. When the operator receives the number required she records this information by means of KS into CRS which transfers this information on a code basis into a series of storage units in SG.

SG acts as a register sender transmitting the called subscriber's identity into DUB and to a long distance selector S2 and through this selector to subsequent switching stages.

The identity of the calling subscriber may be transmitted from automatic line identification equipment to suitable storage units in SG or it may be obtained verbally by the operator and transmitted through KS and CRS into SG. On the completion of the connection the ticket machine and calculator TM becomes associated with the storage group SG by means of the finder F2 and the details of the call are finally recorded in known manner.

In the event of transfer being needed the finder F1 will be associated with the helping position OP2 and the stored information will be again transferred into DUA and DUB of OP2 as before.

The function of SG in sending the numerical information forward will be similar to a conventional register or code sender. The digital sequence will be controlled by a series of relays or by a distributor switch and the same control is used to indicate the progress of digit transmission to the operator.

Fig. 2 shows the manner in which Figs. 4–10 are related to each other and to the component parts of Fig. 1. Part of Fig. 3, Fig. 4 and parts of Figs. 7, 9 and 10 constitute the relevant portions of an operator's position circuit, OP1, Fig. 1. Different wipers of switch F1, Fig. 1, are shown in Figs. 3, 4, 7, 9 and 10, while Figs. 5 and 6, and parts of Figs. 3, 7, 9 and 10 constitute the relevant portions of storage circuit SG, Fig. 1.

Fig. 3 shows the essence of the speaking circuit. The selector S1 is positioned by conventional means to choose a suitable free outlet. The $-ve$ and $+ve$ wipers choose a suitable free outlet. The $-ve$ and $+ve$ wipers $s1ma$, $s1mb$ are extended to relay 1A in the storage group SG.

The finder F1 searches for a free operator's position as described later with reference to Fig. 8.

The operation of the test relay, will complete the speech leads to the wipers $f1ma$, $f1mb$ in conventional manner and speech current will be fed to the operator's head set OHS through relay 1D. Suitable condensers C1, C2 will be placed between 1A and 1D to maintain independent direct current supervision. When the call is extended by the operator the selector S2 will be operated by conventional means to choose a suitable line termination LT1 and a relay 1H (not shown) will be operated in conventional manner to operate switching contacts $1h1$, $1h2$ to disconnect relay 1A and extend the connection to LT1 which may be a four-wire terminal equipment.

Fig. 4 shows the operator's key-set KS containing push keys K1, K2, K3 and K4 arranged to operate via leads KMW . . . KMZ in combination the relays 2W 2X 2Y 2Z, which constitute CRS, Fig. 1 and which are arranged to connect a source of four frequencies W, X, Y and Z to the wipers $f1mc$, $f1md$ by means of contacts $2w1$, $2x1$, $2y1$ and $2z1$. The contacts $2w2$, $2x2$, $2y2$ and $2z2$ are arranged in series to extend a ground via wiper $f1me$ to relay SF, Fig. 5 to indicate the restoration of the keys after each digit transmitted, while KR is a changeover key connected via wiper $f1mf$ to relay SC, Fig. 5.

Figure 5:
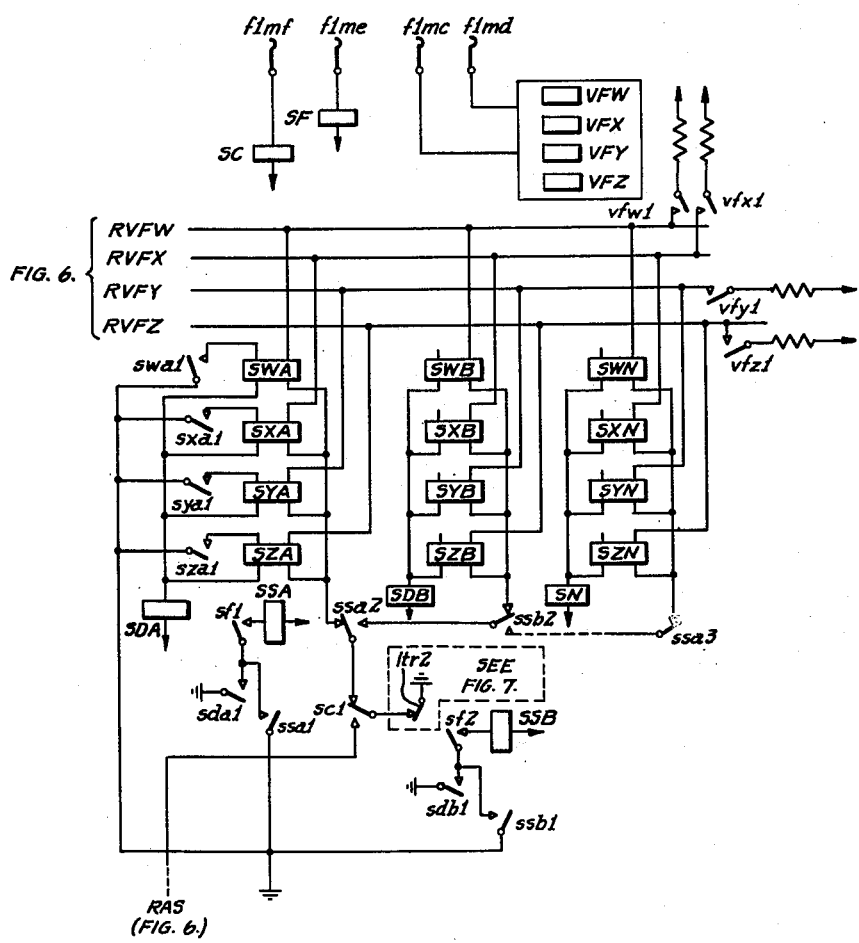
Fig. 5 shows called-number storage equipment forming part of SG, Fig. 1.

Fig. 5 illustrates a part of the storage group SG accessible from Fig. 4. It contains a voice frequency register of any conventional design including four frequency discriminating relays VFW, VFX, VFY, and VFZ. The operation of a combination of these four relays, cause the operation of the corresponding relays of a group of four storage relays SWA, SXA, SYA and SZA via leads RVFW . . . RVFZ. The operating circuit can be traced from battery and potential resistance contacts $vfw1$, $vfx1$, $vfy1$ or $vfz1$, one right-hand winding of one or more of the relays SWA, SXA, SYA, SZA, contacts $ssa2$, and $sc1$ to ground.

The combination of relays operated lock through their second left-hand windings over the circuit-battery, relay SDA, windings of relays SWA, SXA, SYA and SZA, contacts $swa1$, $sxa1$, $sya1$, $sza1$ to ground, and SDA operates.

When the operator releases the key, relay SF operates over wiper $f1me$ contacts $2z2$, $2y2$, $2x2$ and 2w2 to ground. Relay SSA operates via sf1 and sda1. Contacts ssa2 open the operating circuit for relays SWA, SXA, SYA, and SZA and close the corresponding circuits for relays SWB, SXB, SYB and SZB.

The second operation of the key set therefore operates a combination of these relays which lock to relay SDB. When the relay SF operates on release of the second digit key, a circuit is closed for the relay SSB which introduces the third storage group (not shown) and so on to the nth and last storage group shown.

As has already been explained the identity of the calling subscriber may come direct from line identification equipment as described for instance in British Patent 440,348, or from the operator. In the latter case the operator will depress key KR, Fig. 4, which extends ground over the wiper $f1me$ to the relay SC, Fig. 5. Contacts sc1 disable the storage sets SWA, SXA, SYA, SZA; SWB, SXB, SYB, SZB, etc., and close the corresponding operating sets for the storage sets RWA, RXA, RYA, RZA; RWB, RXB, RYB, RZB, etc., in Fig. 6. The leads RVFX, RVFY, RVFZ, RVFW, RAS extend from Fig. 5 to Fig. 6. The operations for the storage of the calling line number are identical to those described for the called line.

Figure 9:
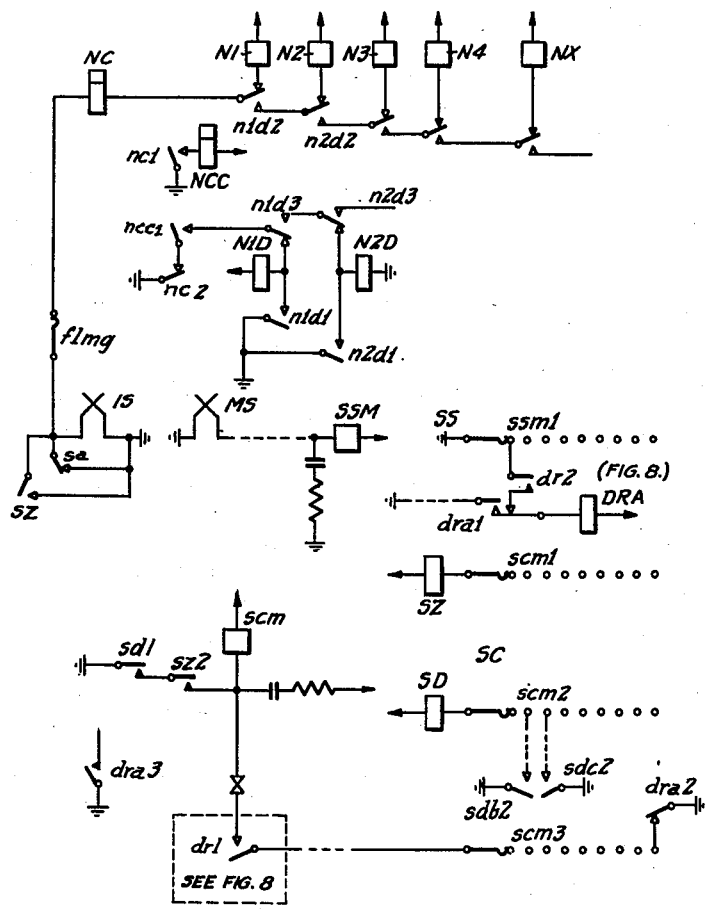

Fig. 9 shows a part of the storage group SG Fig. 1 and a portion of an operator's position OP1 which includes a group of electromagnetically operated digit indicators N1, N2, N3 . . . N$x$ of well known type each of which may be stepped round to indicate one of a number of digits.

The information in the storage groups can be transferred to the number indicators by a series of impulses in the same manner as the transmission of impulses from a conventional director or register translator. This arrangement is so well known that only the essentials of the circuit are shown in order to illustrate the setting of the indicators.

Two pairs of interrupter springs IS and MS operating in synchronism enable the impulses sent over the wiper $f1mg$ by IS to be counted by the switch SS, in co-operation with springs MS. The springs IS are normally short-circuited by contacts indicated at sa which are opened when impulsing is to begin. Relay SZ is used to short-circuit the springs IS. SS is the digit control switch while SC is the sequence control switch. Contacts 1 . . . 10 of wiper ssm1 correspond to 1 . . . 10 digital impulses. The first $x$ contacts of wipers scm1 correspond to the digits 1 . . . $x$ of the called party's number. Each contact 1 . . . $x$ of scm1 is connected to the contacts 1 . . . 10 of wiper ssm1 by a fan of contacts of the corresponding set of storage relays e. g. SWA, SXA, SYA, SZA, said contacts being arranged in known manner so that whichever digital value is recorded by the storage relays, a connection will be established from the scm1 bank contact to, and only to, the contact of ssm1 corresponding to said digital value. Thus when a train of impulses is sent by IS to N1, switch SS steps in synchronism until the number of impulses corresponding to the first digit registered has been sent. At this moment relay SZ will operate via its home contact, the closed storage relay contacts, the marked contact of ssm1 on which the wiper is standing, to earth. Contacts sz1 short-circuit springs IS, while contacts sz2 prepare a circuit for switch magnet SCM to operate. Switch SS is homed in conventional manner at the end of each digit. If the second digit is stored, relay SDB, Fig. 5 is operated and relay SD energises via scm2 completing the circuit for SCM which steps switch SC one step releasing SZ. Succeeding digits are sent out in similar manner, SC being stepped under control of relay contacts sdc2, etc.

At the end of each train of impulses, slow release relay NC which operates in the impulsing circuit, is released. Its slow-release slave relay NCC remains operated for sufficient time to operate relay N1D which locks via n1d1, switches the impulsing circuit from N1 to N2 and switches its own operating circuit to N2D. Relays N2D . . . will operate in turn at the end of successive impulse trains to connect up indicators N3 . . . to receive the corresponding digits.

The transmission of the stored calling line number to the appropriate number indicators is carried out in a similar manner to the transmission of the called number.

Figure 10:
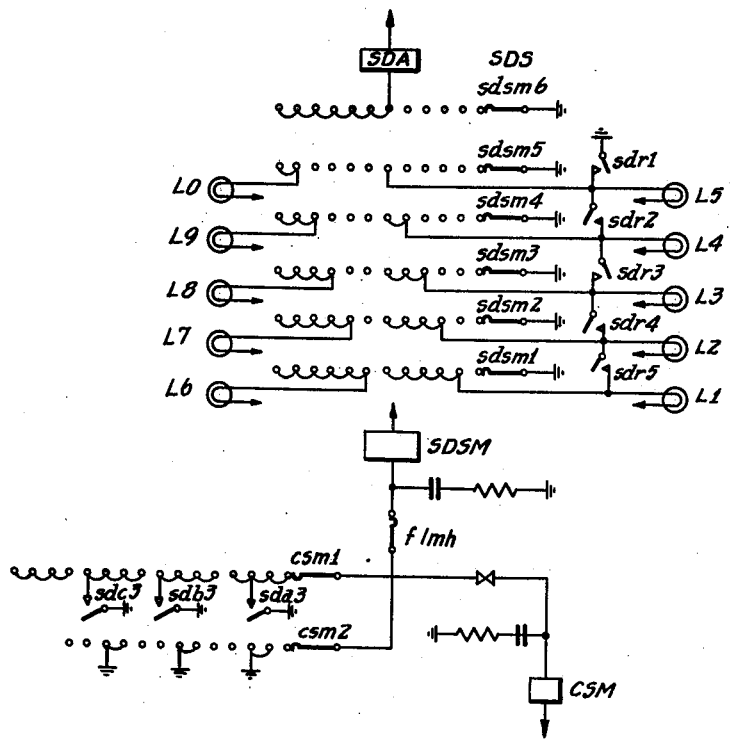
Fig. 10 shows call progress lamp equipment at the operator's position and control equipment therefor in SG, Fig. 1.

The information stored in the storage sets SWA, SXA, SYA, SZA, SWB, SXB, SYB, SZB, etc., can be used for the setting up of the connection in well known manner by the use of the digits so registered for the direct positioning of uni-selectors, or for the choice of the seizing signal transmitted over a long distance connection and for the transmission of the digits in code form as described in my copending U. S. application Serial No. 721,892 filed January 14, 1947. The transmission of the digits can be indicated to the operator and a circuit for this purpose is shown in Fig. 10. It is arranged in conventional manner that for each digit transmitted an impulse is passed via the wiper $f1mh$ to a switch SDS on the operator's position. As the switch SDS advances it lights a series of lamps L1, L2, L3, L4, L5 by the obvious circuit, all lamps lighted remaining alight. After five steps the relay SDR is operated and its contacts maintain the circuits for lamps L1 . . . L5 so that further operation of the switch can illuminate additional lamps, e. g. L6 . . . L10. If the digits keyed by the operator are translated into a larger number of code digits for transmission over the line then the translating device is arranged to suppress one or more of the groups of grounded contacts on the banks associated with wiper csm2. If on the other hand the translation reduces the number of digits additional grounded contacts would be introduced in the same way. The operation of the lamps L1, L2, L3 etc., indicate to the operator how the transmission of the number called is proceeding.

Figure 7:
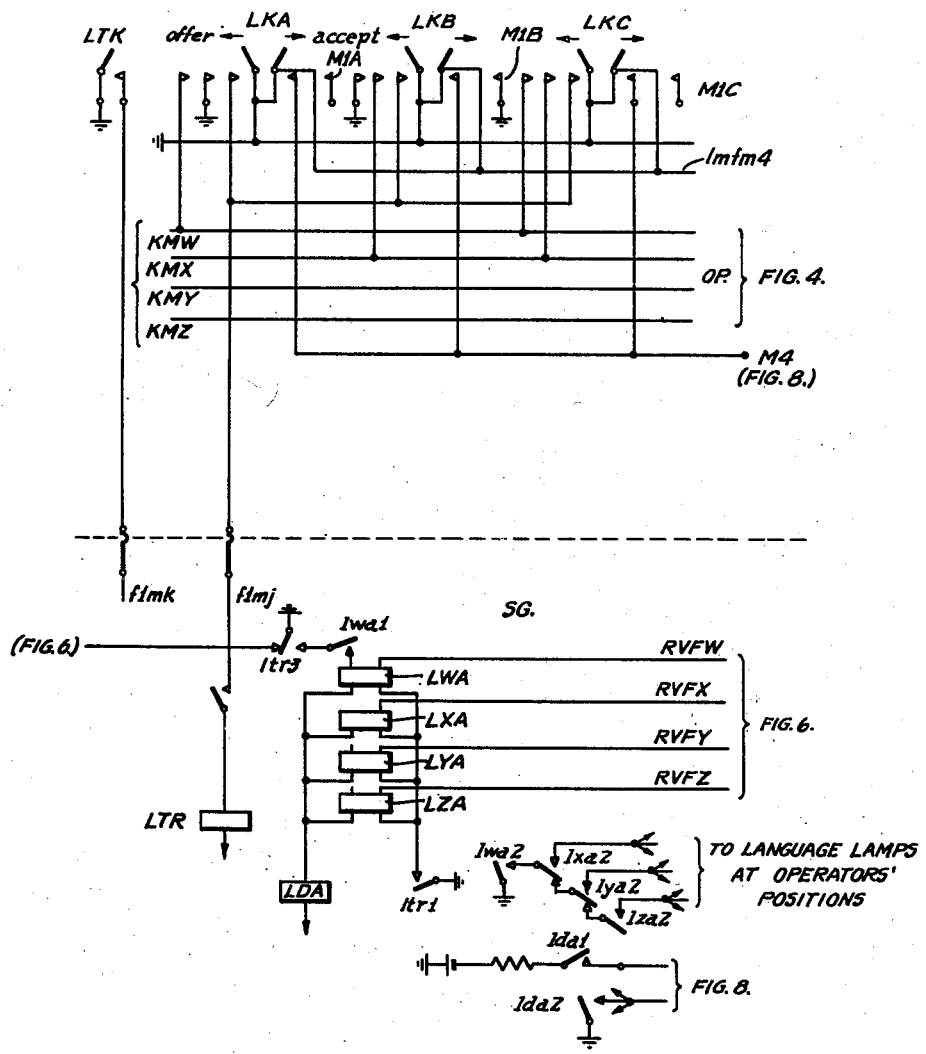
Fig. 7 shows a (language) transfer key set at the operator's position and transfer storage equipment in SG, Fig. 1.

Fig. 7 illustrates the arrangements for preparing the storage group for transfer from one operator to another. LKA, LKB, LKC etc., represent a number of language keys any one of which may be operated to seek the assistance of some other operator on the same or adjacent switchboard. When used for language difficulty each key can be used to represent a different language. The operation of any one of these keys to the left or offering direction causes the operation of relay LTR in the storage group over wiper $f1mj$. The operation of the relay LTR disables the operating windings of the called number storage relay groups Fig. 5 SWA, SXA, SYA, SZA etc., at ltr2 and of the calling number storage relay groups Fig. 6 RWA, RXA, RYA, RZA etc., at ltr3 and at ltr1 Fig. 7 prepares the circuit for the language storage group LWA, LXA, LYA, LZA etc., via RVFW . . . . RVFZ.

These relays are operated from the language keys LKA, LKB, LKC etc., by co-operation with the relays 2W, 2X, 2Y, 2Z in Fig. 4 and the relays VFW, VFX, VFY, VFZ in Fig. 5 in the manner described for digit storage. A selection of the relays LWA, LXA, LYA and LZA characteristic of the language key operated are energised and the contacts lwa2, lxa2, lya2 and lza2 are shown as a means of operating a multiple of language lamps (not shown) at the operators' positions for the language required. There would of course be such a multiple for each language. It is not essential that each operator has an appearance for each multiple as she is enabled to accept one call requiring language assistance by the operation of a key, particular to such language. The relays LWA, LXA, LYA, LZA lock in conjunction with the relay LDA. Contacts lda1 indicate to the transfer control circuit Fig. 8 that this circuit Fig. 7 has a call to transfer and contacts lda2 indicate to a common start circuit Fig. 8 that there is a language transfer imminent. It will of course be understood that additional storage groups such as LWA, LXA, LYA, LZA may be provided if more than 15 possibilities are required. Although the description refers to transfer for language difficulty it will be understood that a corresponding operation may be carried out for other purposes such as delay working or concentration of certain types of traffic.

Figure 8:
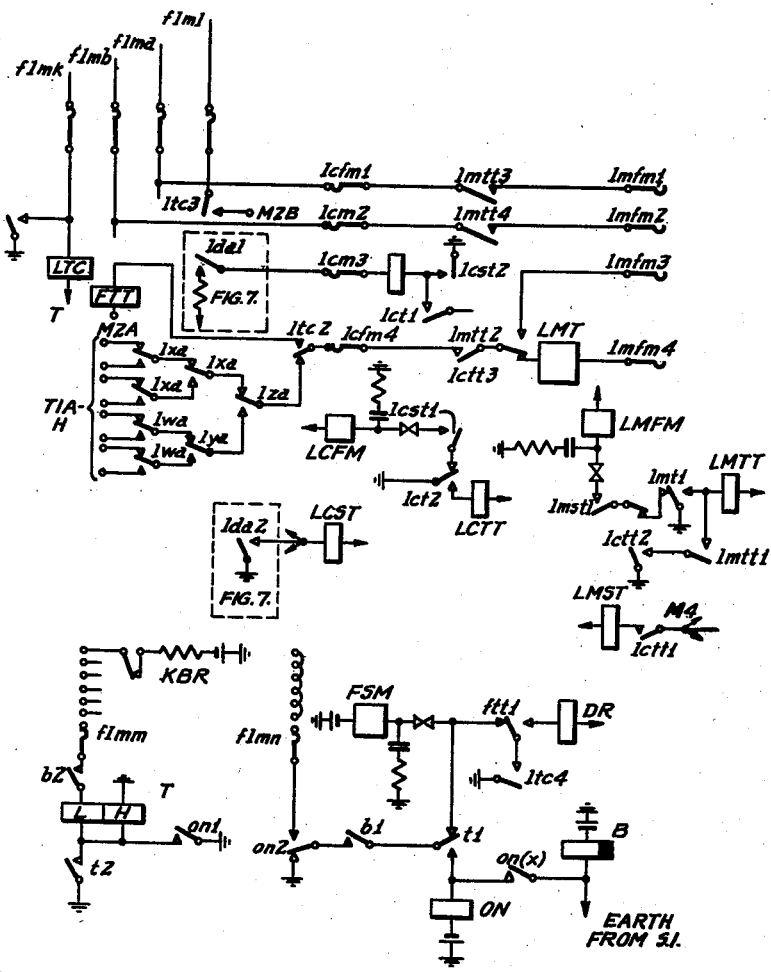
Fig. 8 shows a (language) transfer control circuit associated with Fig. 7.

Fig. 8 illustrates part of the circuit of SG, Fig. 1 and the language control transfer link which comprises the finder LCF which has access to the storage groups SG and the finder LMF which has access to the operators' positions. When an application for transfer is received the operation of the relay LDA Fig. 7, indicates this fact in associated storage group SG. Contacts lda2 in Fig. 8 extend this condition to the start relay LCST which starts the finder LCF running in search for the storage group marked by a battery potential on the contact of test wiper lcfm3 provided by the contact lda1. The relay LCT finds this condition and opens the stepping circuit of magnet LCFM, and closes an obvious circuit for the relief relay LCTT.

Any operator accepting a language transfer request operates the relevant one of the language keys LKA, LKB, LKC, etc., but in the reverse direction to when offering a call, that is, to the right or "accept" direction.

A ground through any of these keys, Fig. 7, is extended through terminal M4 and the operated contacts of lctt1 to LMST, and the finder switch LMF steps under control of the test relay LMT. The test circuit is completed from the key contact MIA, MIB or MIC, through the wiper lmfm4 the test device LMT, lmtt2, lctt3, the mark wiper lcfm4, the contact ltc2, a combination of the relay contacts LWA, LXA, LYA and LZA particular to the language involved to one of the marking terminals TIA . . . H. Each language can be given a different marking characteristic by a phase different to an A. C. supply, a different voltage potential, or a different A. C. frequency, etc.

The essential control is provided by the fact that the storage group indicates the language involved, this language is indicated to an operator by a lamp, and she accepts the call by the operation of a key characteristic of the same language.

It will be assumed that multi-potential marking is used, so that contacts MIA, MIB, MIC, Fig. 7 etc., will have different potentials applied thereto, while terminals TIA . . . , Fig. 8, will be connected to the same set of potentials, the same potential being connected to the key contact and the T1 contact characteristic of the same language. The test device IMT will now be a circuit such as that described in U. S. Patent No. 2,354,682 issued Aug. 1, 1944. When wiper lmfm4 makes connection with the key contact having the same potential as the connected T1 terminal than the test device will operate.

In this condition, both operators can listen in to the connection and if the operator decides to transfer the call to the second operator she operates a general transfer key LTK, Fig. 7, which operates the relay LTC, Fig. 8 via the wiper f1mk. The finder F1 now advances from the first operator's position to the second, the magnet FSM being operated as described below. The marking conditions are transferred from a language basis to one which is indivdual to the storage group.

Each storage group will have two marking terminals M2A, M2B, Fig. 8 connected to the same potential; the potentials will of course differ for each storage group, and the storage group potentials will differ from the language potentials. When switch F1 finds the accepting operator's position, the characteristic marking is extended from M2A through relay FTT, ltc2, wiper lcfm4, lmtt2, wiper lmfm3 via the accepting operator's position and her contact in the bank of wiper f1m1 to the marking terminal M2B. Relay FTT operates in the test circuit, the stepping ceases, and the relay DR is operated.

It has been assumed previously that switch F1 has been stepped to a free operator's position. The operation of the switch will now be described with particular relation to its release of the operator's position when the connection has been satisfactorily set up. The finder is initially operated to look for a free operator's position by earth from selector S1 which operates slow-release relay B, Fig. 8. Earth via on2, b1, t1 causes magnet FSM to step switch F1 by means of its interrupter springs. A free operator's position is indicated by battery via a key KBR (Fig. 8) on the corresponding contact of wiper f1mm. When a free position is found relay T operates via its high and low resistance windings H, L in series and holds via its low resistance winding L only to earth on t2, the short-circuiting of winding H altering the potential on the f1mm contact from the free to the busy condition.

The operation of contacts t1 opens the finder stepping circuit. Earth via on2, b1, t1 operates relay ON which locks via its quick acting contacts onx to earth from S1, puts a second earth on the L winding of relay T at on1 and prepares a homing circuit for finder F1 at on2.

When the operator has set up the connection and is satisfied that it is proceeding satisfactorily, she temporarily releases key KBR opening the circuit of relay T which releases. Earth via on1 still short-circuits winding H of relay T after the relay has released thus preventing T operating during homing.

Magnet FSM is now connected via its interrupter spring t1, b1, on2 to the multipled homing bank f1mn of finder F1 which runs to its home position and stops. Relays B, ON remain operated until selector S1 releases and removes the earth operating relay B.

Relay DR, Fig. 8, which operates if finder F1 of a storage group transfers from one operator's position to another as described above, acts to cause the indicators of the second operator's position to display particulars of the connection.

Thus referring to Fig. 9 contacts *dr1* complete a circuit from magnet SCM and its interrupter springs to wiper *scm3* and its homing multiple.

Switch SC steps to its home position in which relay DRA energises via change-over contacts *dra1*, closed contacts *dr2*, wiper *ssm1*; locks via *dra1* operated; disconnects the homing earth from the homing multiple of *scm3*; and via *dra3* operates the SA relay (not shown) whose conventional function as previously stated is to remove a normally operative short-circuit on impulse springs IS and start impulsing to the indicators N1, N2, etc., under control of switches SS, SC.

In this way the called number is set up on the second operator's indicator. In the same way the calling party's number is set up on the indicators.

Similarly the progress of the connection can be indicated to the second operator. Digit sending devices such as register controllers usually comprise a sequence device which changes conditions as each digit is sent e. g. a switch which takes one step for each digit. It would be conventional practice to have a second similar slave switch with contacts of a bank straight multipled to contacts of a bank of the sequence switch and to arrange that on operation of relay DR the slave switch would step to the position already reached by the sequence switch, an impulse being sent via wiper *f1mh* Fig. 10 to switch magnet SDSM for each step of the slave switch to light a corresponding number of lamps. Further movement of the sequence switch, or the slave switch, as further digits if any are transmitted would cause further impulses to be sent.

What is claimed is:

1. Telecommunication exchange apparatus for completing a connection between a calling line and a called line, and comprising in combination, switchboard equipment having a plurality of operators' positions, a digital designation register connectable in common to said positions, a code responder for each position, manually operable means at each position effective to operate said code responder in accordance with a digital designation, means to cause said code responder to control the storing of successive digital designations in said register, other manually operable means at each position for operating said code responder and simultaneously disabling said digital designation register, additional registering means in the register, means for selectively operating said additional registering means in accordance with the operation of said code responder in response to the operation.

2. Telecommunication exchange apparatus, according to claim 1, in which the operation of the responder by the other manually operated means characterizes the language of the call and said indicator at each position comprises a series of different colored indicators each representing a particular call language.

3. Telecommunication exchange apparatus, according to claim 1, in which the first-mentioned manually operable means comprises a set of digital code keys for controlling said register, said other manually operable means comprises an additional key set with each key having two effective positions, circuit connections between the second key set and said responder effective in one setting of a key for selectively setting said responder, circuit connections between said second key set and said register effective in the same setting of a key to cause the additional registering means in said register to be set by said responder, so as to offer the supervision of the call to another position, and means effective in another setting of a key to accept supervision from another position and to complete a connection to said other position.

4. Telecommunication exchange apparatus, according to claim 1, in which the first-mentioned manually operable means includes a series of digital keys for controlling said register, the other manually operable means comprises a series of language keys one for each call language and circuit connections between said language keys and the responder, said keys being selectively operable to set said responder in accordance with a predetermined code.

5. Telecommunication exchange apparatus for completing a connection between a calling and a called line comprising in combination, switchboard equipment having a plurality of operators' positions, a digital storage arrangement connectable in common to said positions and having means to store the calling line and called line digital designations transmitted from an operator's position to which said storage arrangement has been connected, means to extend an incoming call to a free operator's position, digital designation indicators at each position, each of said positions having keys one for each language characteristic of a call, each key having two settings, means responsive to one setting of a key for preparing the transfer of a call from said operator's position to any other operator's position, means responsive to the other setting of said key for controlling the acceptance of the transfer of the call from another operator's position, and circuit connections between said keys and said storage circuit and between said storage circuit and said digital designation indicators and effective when the key is operated to an accept position for automatically setting the digital indicator at the particular operator's position accepting said transfer.

6. Telecommunication exchange apparatus for completing a connection between a calling line and a called line comprising in combination, switchboard equipment having a plurality of operators' positions, means for extending an incoming call to a free operator's position for normal supervision at said position, each position having indicator means to be selectively operated to indicate a particular predetermined characteristic of a call to be established between said lines, digital register means connectable in common to said positions, a code responder for each position, manually operable means at each position for variably setting said responder to control the setting of said register and thereby automatically control the extension of the connection towards the called line if the call is to be completed in the normal manner, other manually operable means at each position to be used when the call is not to be completed in the normal manner for operating said responder in accordance with a code representing said call characteristic, and means controlled by said other manually operable means for selectively operating said indicator means at said other positions to prepare for the transfer of the supervision of the call to any other position, said other manually operable means also including means to control the acceptance of a transfer from another position.

7. Telecommunication exchange apparatus, according to claim 6, in which the other manually operable means is selectively operable to control the acceptance of a call from another operator's position, said apparatus further comprising an automatic finder switch for selectively connecting the digital register to the operator's positions, means responsive to an incoming call to cause said finder switch to connect said digital register to a free operator's position, and a double automatic switch link for automatically associating said register with another operator's position at which said other manually operable means is operated to its call-accept position.

8. Telecommunication exchange apparatus, according to claim 7, in which circuit connections are provided for automatically operating the finder switch to hunt for the other operator's position, and means effective when said other operator's position has been found and controlled from the free operator's position for transferring supervision of the call to said other operator's position.

9. Telecommunication exchange apparatus for completing a connection between a calling line and a called line comprising in combination, switchboard equipment having a plurality of operators' positions each of which is arranged when free to receive directly an incoming call and is also arranged to receive an incoming call after accepting transference from another operator's position, a digital register for controlling the automatic extension of the connection, an automatic finder switch responsive to the incoming call to associate said register with the first free operator's position, each of said positions having means to indicate the calling line designation and the called line designation, circuit connections effective upon association of said register with said free operator's position for preparing the operation of said indicating means thereat, each position having a set of manually operable keys and a corresponding set of call-characteristic indicators, a code responder connected to said keys and arranged to be variably set by said keys either in accordance with digital designations or in accordance with a code representing a call characteristic, means controlled by said responder means effective when said responder is being operated in accordance with said code to prevent said responder changing the digital setting in said register, each operator's position also having a set of lamps each representing a different call characteristic, for example, a language characteristic, circuit connections effective when the operator at said first free position operates one of said keys and including the responder at said first free position for selectively lighting a corresponding one of said lamps at the other operator's positions, said one key having means connected to it to produce a call-transfer-accept condition, automatic switch means responsive to said transfer-accept condition at any one of said other operator's positions for associating said register therewith, and means controlled by the said first free operator's position for causing the registered digital information to be transferred to the accepting operator's position.

10. Telecommunication exchange apparatus, according to claim 9, in which the automatic switch means comprises an automatic switch link consisting of a pair of finders one of which hunts for the accepting operator's position and the other of which hunts for the register.

11. Telecommunication exchange apparatus comprising, in combination, a plurality of operators' positions, a register, automatic switch means responsive to an incoming call received by said register to associate said register with the first free operator's position, key means at each position for controlling said register when said register is associated with said position, a code responder connected to and controlled by said key means, a plurality of language indicator lamps at each position, means for connecting the code responder to the lamps at each position, means including the code responder for selectively controlling said lamps, and means effective when the code responder at said free operator's position is being set in accordance with a language characteristic to disable said register.

12. In a telecommunication exchange system of the kind described, a first operator's position, a second operator's position, a digital register for controlling the automatic extension of a connection, a finder switch, means responsive to an incoming call received by said register for operating said finder switch to associate said register with the first operator's position, a call-transfer-accept key means at said positions, means at each position controlled by said key means for producing a visual indication representing a particular call characteristic, for example, language, and automatic switch means controlled jointly by the operation of a call-transfer key means at the first position and a call-transfer-accept key means at the second position to associate said register with said second position, the last-mentioned means including means to cause said finder switch to hunt for the said second position and to disassociate said first position from the register.

13. A telecommunication exchange system, according to claim 12, in which the last-mentioned automatic switch means includes a double finder switch link, one finder hunting for the second operator's position and the other finder hunting for the said register.

ESMOND PHILIP GOODWIN WRIGHT.

REFERENCES CITED

The following references are of record in the file of this patent:

UNITED STATES PATENTS

| Number | Name | Date |
|---|---|---|
| 1,256,087 | Williams | Feb. 12, 1918 |
| 1,272,280 | Lundell | July 9, 1918 |
| 1,438,743 | Clark | Dec. 12, 1922 |
| 1,464,084 | Lundell | Aug. 7, 1923 |
| 1,509,691 | Richardson | Sept. 23, 1924 |
| 1,592,646 | Ray | July 13, 1926 |
| 2,139,800 | Bonorden | Dec. 13, 1938 |
| 2,161,376 | Moody | June 6, 1939 |
| 2,370,736 | Kittredge | Mar. 6, 1945 |